US006326191B2

(12) United States Patent
VanToever

(10) Patent No.: US 6,326,191 B2
(45) Date of Patent: Dec. 4, 2001

(54) FLUIDIZED RADIAL FLOW BIOREACTOR UTILIZING PELLET MEDIA

(76) Inventor: James Wayne VanToever, c/o Waterline Ltd., R.R. #10 Winsloe, Prince Edward Island (CA), C1E 1Z4

( * ) Notice: Subject to any disclaimer, the term of this patent is extended or adjusted under 35 U.S.C. 154(b) by 0 days.

(21) Appl. No.: 09/761,419

(22) Filed: Jan. 16, 2001

Related U.S. Application Data

(63) Continuation of application No. 09/151,342, filed on Sep. 11, 1998, now abandoned.
(51) Int. Cl.[7] ..................................... C12M 1/14
(52) U.S. Cl. .............. 435/299.1; 422/139; 422/140; 422/211; 422/216; 422/218; 435/297.1; 435/297.2; 210/167; 210/196; 210/282; 210/286
(58) Field of Search ................... 422/139, 140, 422/211, 216, 218; 435/286.5, 297.1, 297.2, 299.1; 210/167, 196, 282, 286

(56) References Cited

U.S. PATENT DOCUMENTS

| | | | |
|---|---|---|---|
| 4,028,244 | 6/1977 | Holmberg | 210/150 |
| 5,055,186 | 10/1991 | Van Toever | 210/150 |
| 5,413,749 | 5/1995 | Geiser | 264/293 |
| 5,593,574 | 1/1997 | Van Toever | 210/150 |

FOREIGN PATENT DOCUMENTS

WO 87/05593  9/1987  (WO) ................ C02F/3/28
WO 98/09919  3/1998  (WO) ................ C02F/3/12

Primary Examiner—David A. Redding
(74) Attorney, Agent, or Firm—Simpson, Simpson & Snyder, PLLC

(57) ABSTRACT

Disclosed is a bioreactor apparatus having a bed of buoyant media pellets floating within a filtrate to be processed. The apparatus includes a tank having a peripheral wall for containing filtrate and a bed of media pellets. A central manifold is rotatably supported within the tank the central manifold being mounted for rotation about a vertical axis and having a plurality of longitudinally spaced openings intermediate its ends, the openings adapted to eject filtrate in a generally horizontal direction and along a substantially vertical plane toward the wall of the tank. A thrust manifold, generally parallel to the axis of the central manifold has a plurality of longitudinally spaced openings intermediate its ends directed horizontally and generally perpendicularly to the plane. The thrust manifold is supported in association with the central manifold inwardly adjacent the tank wall and offset rearwardly of the plane to rotate with the central manifold. Filtrate is fed to the central manifold and the thrust manifold, whereby the plane of filtrate ejected by the central manifold fluidizes a vertical zone of pellet media around and in front of the thrust manifold and rotation of the central manifold and thrust manifold is caused by filtrate ejected from the openings in the thrust manifold. The invention also comprehends specially designed pellet media for optimum performance. The manifolds may be structural for retrofitting in existing bioreactors.

15 Claims, 5 Drawing Sheets

FLUIDIZED RADIAL FLOW BIOREACTOR UTILIZING PELLET MEDIA

RELATED APPLICATION

This continuation application claims the benefit of U.S. patent application Ser. No. 09/151,342, filed Sep. 11, 1998 now abandoned.

FIELD OF THE INVENTION

The invention relates to bioreactors used to culture a wide variety of microorganisms and organisms such as algae, for various purposes from filtering dissolved wastes in water, digesting organic wastes to producing pharmaceutical end-products.

BACKGROUND OF THE INVENTION

U.S. Pat. Nos. 5,055,186 and 5,593,574 granted Oct. 8, 1991 and Jan. 14, 1997, respectively, to VanToever, relate to bioreactor systems, primarily biofilter system, using fluidized pellet media Although such systems are effective, efforts to scale up the systems have encountered some difficulties, particularly when the objective is to provide a bioreactor system having maximum possible effective surface area for cultural bacteria and other microorganisms to provide a system which is self cleaning and relatively maintenance free as much as possible and to provide a system which operates with low energy consumption.

More particularly, the revolving downflow injector design described in U.S. Pat. No. 5,593,574 works adequately with shallow filter media beds. The concept of fluidizing only a narrow zone of media at any given time rather than the conventional method of continually fluidizing the entire bed of media enabled a drastic decrease in the energy required for fluidization Nevertheless, efforts to scale-up such downflow injector filters with greater tank diameters, (>1 m) and media bed depths, (>1 m), using this design, required significant increases in pump size to provide sufficient energy to fluidize the pellets. Since the low density plastic pelleted media is buoyant, (specific gravity of 0.91–0.93 relative to water), the downward directed jets of filtrate must have sufficient force to counter the buoyancy and flotation of the media in order to fluidize the bed. With increased bed depth, the energy required increased significantly. By increasing the pressure and flow of filtrate, deep beds could be fluidized but at exceedingly high, if not, prohibitive operating costs.

Additionally, the increased turbulence caused by the high energy injection would frequently cause media pellets to wash out of the filter.

Extensive efforts have lead to the development of a new, much superior configuration.

Initially efforts focused on slowing the rotation of the downflow filtrate injector system represented by U.S. Pat. No. 5,593,574. The fluidization of a given zone is not instantaneous and a period of time is required for the jets of filtrate to penetrate and fluidize a given cross section of media. Efforts to improve the system included the use of low speed gear motors to slow and accurately control the speed of rotation to ensure complete fluidization. With larger beds, that is, with media beds greater than 1 meter in diameter, rotational speeds of ¼ rpm and filtrate flows of approximately $600/1/min/m^2$ of filter bed surface area were required. However, faster rotational speeds tended to result in incomplete fluidization of the media Further, in order for downward directed jets of filtrate to fluidize the media, the jets had to have sufficient energy to counteract the upward flotation, (buoyance), of the media as well as to counteract the friction in the media bed.

Accordingly, it would be advantageous to provide an injector system to fluidize the media bed which would ensure that all areas of the filter media bed receive as uniform a flow of filtrate as possible and which could be expanded radially or indepth to encompass larger media beds.

The earlier U.S. Pat. Nos. 5,055,186 and 5,593,574 referred to above, utilize plastic media pellets and the system to which this invention is directed also depends on the use of plastic media pellets. The purpose of the media is to provide an optimal 'engineered' surface area for culturing bacteria, fungi and other microorganisms, while at the same time providing the maximum possible effective surface area per unit volume of filter at a reasonable cost. The desired microorganisms require a surface to colonize and with the appropriate nutrients and environment a diverse ecological mix of species establishes and grows to create a biofilm. The biofilm adheres to the substrate—media pellets—and will generally flourish and grow until it plugs the interstitial spaces between the supporting media and blocks the flow of nutrients to the microorganisms. Additionally, particulates in the filtrate also adhere to the "sticky" biofilm through a number of mechanisms and serve to accelerate the plugging of the filter. An effective filter therefore has to continually harvest excess biofilm and particulates in order to maintain an optimal biofilm which is constantly in a growth phase condition, rather than one that cycles between "start-up-growth-plugging- crashing-cleaning-start-up". The fluidized bed design can provide an environment wherein excess biofilm is continually scoured off the media, while sufficient shelter is provided to provide an adequate environment for maintenance of a continually self renewing, optimally, thin biofilm.

Conventional fluidized beds generally utilize randomly configured support media such as sand and plastic material. Creased or grooved media pellets are disclosed in the above-noted U.S. patents. Nevertheless, it would be advantageous to have media pellets which have very specific characteristics and which are manufactured to a specific engineered design to optimize film growth and to be compatible with the radial flow injection system developed.

The filter design relies on the buoyancy of the media pellets to maintain the media bed within the filter. Insufficient buoyancy or excessively high filtrate flow rates which result in excess downflow velocities will wash the media out of the filter outlet. Earlier attempts to screen the outlets of the filters proved futile since the biofilm grows rapidly and plugs the screens.

Biofilms for example, have a specific gravity of approximately 1.07 relative to water. The low density plastic pellet has a selected specific gravity in the range of 0.91 to 0.93 so that it floats in water. The media pellet must therefore be designed with sufficient mass so that the ratio of the maximum supportable biofilm mass, to the pellet mass remains less than one or the pellets will sink.

An apparently obvious solution would be to decrease the density of the plastic and increase the buoyancy. A small increase in buoyancy, however leads to drastic increases in the energy required to fluidize the media, especially in the start-up phase when there is no biofilm present to counter the buoyancy of the pellets. Since energy consumption is a critical factor in determining the success of the bioreactor design, significant increases in buoyancy of the media pellets is not a cost effective option.

All characteristics of the pellet must be considered together to achieve a successful design. A balance must be achieved between the cost of materials and manufacturing, the effective surface area for biofilm culture per unit volume of filter and the dimensions of the sheltered grooves which determines the biofilm biomass relative to the mass of plastic per pellet as this relationship determines pellet buoyancy once the biofilm is established. The design of the pellets must be such to minimize interlocking of pellets which increases energy requirements for fluidization. Further, the pellets must be as small as possible to minimize surface area per unit volume while providing adequate mass for buoyancy as described.

Accordingly, it would be advantageous to have pellet media which have proven to be an acceptable compromise between the various design parameters noted above, particularly in fluidized bed systems as set forth herein.

SUMMARY OF THE INVENTION

In order to secure greater uniformity in the fluidization of pellets by filtrate, a new approach was investigated wherein the filtrate would be injected horizontally to fluidize the media, as this would eliminate the buoyancy factor. The design developed provides for orifices in a central, vertical rotating, main manifold directing pumped filtrate in horizontal streams or a 'jets' out towards the periphery of the filter bed. Since the main manifold is located in the centre of the cylindrical bed and rotates about the central vertical axis there is virtually no friction to overcome in order to turn it. The central or main manifold rotates slowly enough to permit the jets to horizontally fluidize a zone of media from the centre extending out to the perimeter of the reactor. With the previous filter design noted in the background of the invention, as the filter depth of the media bed increased, the downward pressure and flow required for each filtrate jet also increased in order to fluidize the media bed. With the new design, the horizontal distance from the central manifold to the periphery is constant with depth and with equal spacing of the orifices or nozzles on the central manifold, each jet from the orifices fluidizes an equivalent sized zone of media. To fluidize deeper media beds for a given filter diameter requires simply extending the length of the central manifold and adding more orifices, each with equivalent flow and pressure. The flow required to fluidize a given diameter of filter bed increases linearly with depth while pressure remains essentially constant with the radial flow design. With the previous downflow design, pressure and flow requirements increased with depth, therefore increasing energy costs for operation.

Further, it was desirable to develop simple mechanisms to rotate the central manifold and control the speed of rotation. Speed control is relatively important in this design since a period of time is required for the horizontal jets to penetrate the media bed and totally fluidize a given zone all the way to the periphery of the bed.

Rotational speed controls developed for some previous dowmflow designs relied on expensive low speed gear motors and relatively complex mechanical configurations. Given the often corrosive, environments in which the filters operate (often salt water) the costs were significant. Significant maintenance was required and mechanical failures were more frequent than desired. The goal was therefore to develop a simple design which would be inexpensive and dependable.

Accordingly, in the present design, jets of filtrate from the vertical rotating central manifold fluidize an arcuately narrow vertical zone of media pellets in a radial direction from the centre to the periphery of the filter. The pressurized jets of filtrate work their way through the media bed until the pellets in a narrow vertical zone are completely fluidized. Fluidization of the zone of media from the centre to the periphery however requires several seconds.

The viscosity of the media is very low in the fluidized zone relative to the adjacent non-fluidized zone. The injector system of the invention utilizes this viscosity differential and the time lag for fluidization of a given zone, as a basis for rotational speed control.

A second vertically extending manifold, a thrust injector or thrust manifold, is located at the outer perimeter of the filter bed and is preferably connected to the vertical central manifold by horizontal support manifolds which are above and below the media bed. The thrust manifold is offset so that the horizontally directed filtrate jets from the central manifold are directed ahead of it. Orifices are located down the side of the thrust manifold and are oriented horizontally perpendicular to the central manifold orifices, that is, oriented generally in a tangential direction to the bed of media Thrust created by the pumped filtrate emerging from the thrust manifold orifices pushes the thrust manifold forward into the low viscosity, fluidized zone created by the jets from the central manifold. The central manifold is therefore continually creating a low viscosity zone rotationally in front of the thrust manifold, so very limited thrust is required to move the vertical thrust manifold ahead. The viscosity of the unfluidized bed of media will not allow the thrust manifold to move forward beyond the zone fluidized by the jets from the central manifold. Since the two manifolds are physically connected by the support manifolds and in fluid communication with each other, a positive feedback control is established and the injection system rotational speed is therefore self governed and ensures that the thrust manifold cannot rotate unless complete fluidization of the zone in front of the thrust manifold by the jets from the central manifold is achieved from the centre to the periphery of the bed. With each complete revolution of the manifold through the pelleted media, the entire bed is thoroughly fluidized and the filtrate is uniformly distributed to all biofilm surfaces in the filter media bed.

Filtrate flow rates can be increased substantially if desired and additional thrust manifolds can be added to the central manifold. The distance that a pressurized jet of filtrate can effectively penetrate a bed of media is limited, for example, approximately 0.5 m, before the energy is significantly dissipated. To fluidize wider diameter beds of media, the horizontal support manifolds can be extended by additional support manifolds and additional or secondary vertical injectors or manifolds can be added between the additional support manifolds at intervals, for example, at intervals of approximately 0.5 m These vertical secondary manifolds are similar in design to the central manifold. However, each of the secondary manifolds is offset from the one immediately inward thereof in order for the filtrate jets of the radially inward manifold to fluidize the arcuate zone in front of the manifold and thus enable it to move forward. Only the radially outermost manifold need be of the thrust manifold configuration since the maximum torque is achieved by providing thrust at the inner periphery of the tank.

The new injector system could also be potentially applied to larger filter bodies of circular or other polygonal shapes. A number of injector units could be supported on a frame above a bed of media and the injectors would each act to fluidize overlapping cells of media. A pipe manifold system would be used to uniformly distribute the filtrate to each of the multiple injector heads.

Further, it will be apparent that the new injector system can be retrofitted to existing bioreactor systems. A manifold structure comprising the central manifold with radially directed openings in association with an offset thrust manifold suitably supported and capable of ejecting filtrate in accordance with the above, can be easily incorporated into an existing bioreactor tank with minimal piping restructuring.

The disclosed method of injecting the filtrate is very efficient and minimizes the flow requirements in comparison with other and conventional fluidization techniques which fluidize the entire bed and require very high flow rates with large pumping rates and energy consumption.

As with the previous bioreactor designs, solids consisting of excess sheared biofilm and fine particulates settle and are flushed daily from the system via a bottom drain valve. This flushing is the only required maintenance for the bioreactor as it is otherwise self-cleaning.

With respect to the media pellets, applicant has found that pellets having certain physical parameters and optical dimension ranges are to be preferred for the most efficient operation of the bioreactor herein. A simple configuration of a pellet is preferable, which can be manufactured in a one step, low cost extrusion process, the extruded length with appropriate grooves/ridges being sliced to produce the final pellets. Although pellets fabricated by combinations of other manufacturing processes, such as injection or extrusion, combined with secondary stamping or roll forming of surface configurations, are recognized as possible, designs of pellets which are compatible with one step extrusion are more cost effective to fabricate. Nevertheless, the pellet design is not a random design but is engineered to very specific criteria to be described herein.

BRIEF DESCRIPTION OF THE DRAWINGS

The nature and mode of operation of the present invention will now be more fully described in the following detailed description taken with the accompanying drawings wherein.

DESCRIPTION OF THE PREFERRED EMBODIMENTS

Figure 1:
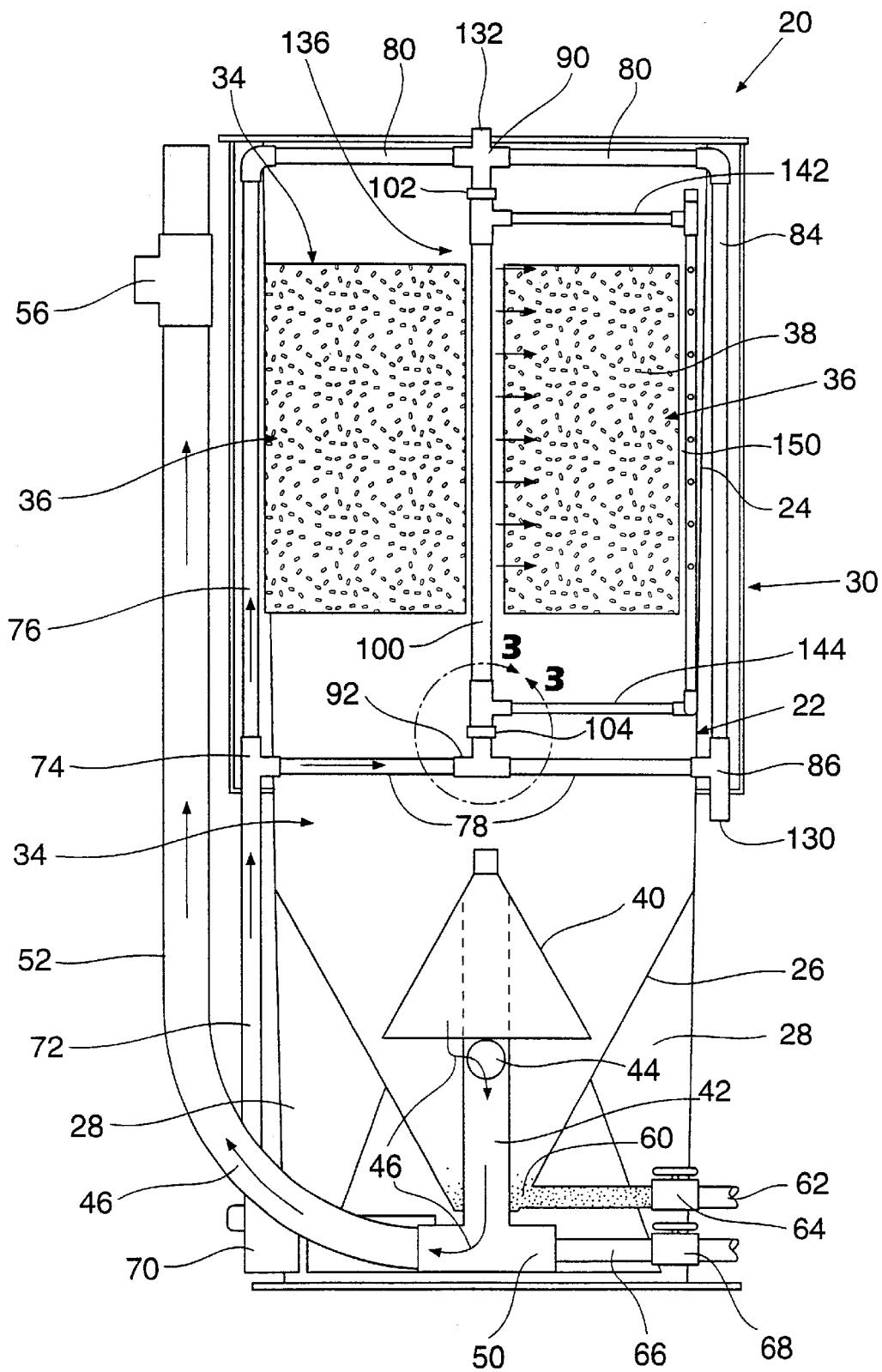
FIG. 1 is an elevational view of a bioreactor according to the invention, with the front wall of the tank removed for purposes of clarity.

Turning to FIG. 1, a bioreactor 20 is illustrated in elevational view with the front wall of the tank 22 removed. Bioreactor tank 22 has an upper cylindrical portion 24 and a lower conical portion 26. Tank 22 is supported by supports 28, only two being shown. Tank 26 would have other like supports 28, front and back, but they have been omitted for the sake of clarity. Peripherally outwardly of tank 22 is cylindrical housing 30, the spacing between housing 30 and tank 22 being sufficient to accommodate associated piping and conduits to be described further herein. Tank 22 contains filtrate 34 to be filtered and a low density media bed 36 of pellets 38 floating in the upper portion of the filtrate 34.

Cone shaped baffle 40 is supported by filtered effluent manifold 42, which manifold has opening 44, through which filtered or processed effluent may flow. Filtered or processed effluent is removed from the bioreactor 20, through opening 44 and as shown by arrows 46, through conduit junction 50 and outlet conduit 52. Outlet conduit 52 has a level control opening 56 through which filtered or processed effluent can be removed for use elsewhere, for example, filtered water, in an aquaculture system as disclosed in U.S. Pat. No. 5,593,574. However, the bioreactor system is operable with other forms of filtrate than water.

Bottom 60 of conical tank portion 24 concentrates solid waste, which is mainly scoured excess growth from media pellets 38. The solid wastes are periodically removed via conduit 62 and valve 64 in known fashion. Conduit 66 and valve 68 provide means for cleaning and flushing out the tank system.

Inlet pump 70 is located to pump filtrate to be processed in the bioreactor from a source, (not shown), through conduit 72 into a manifold system associated with tank 22.

Figure 3:
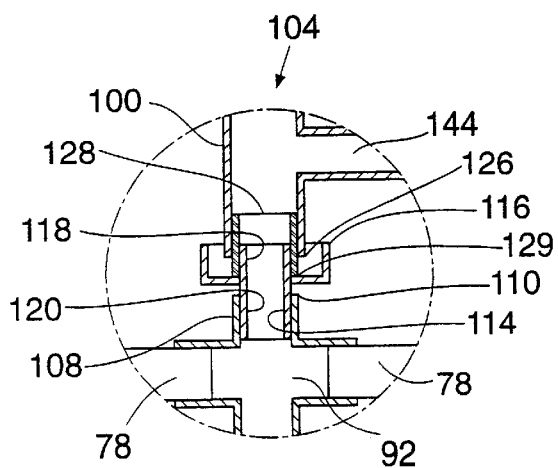
FIG. 3 is an enlarged view of the lower bearing or support system for the central or main manifold of the bioreactor taken around line 3—3 of FIG. 1.

Conduit 72 extends upwardly from pump 70 and connects at T connector 74 with vertical and horizontal filtrate inlet conduits 76 and 78. Vertical conduit 76 continues upward between tank 22 and housing 32 and is in fluid communication with upper, horizontal conduit 80 which crosses diagonally the top of tank 22 and is in fluid communication with conduit 84 which extends downwardly on the other side of tank 22 inside housing 32 to T connector 86. Horizontal filtrate inlet conduit 78 extends diagonally across and within tank 22 and connects with connector 86. It will be appreciated that conduit 78 is sealed with respect to tank 22 where it enters and exits the wall of the tank 22. Upper and lower central manifold connectors 90 and 92 are associated with conduits 78 and 82 and rotatably support central manifold 100 through bushing slip joints 102 and 104. Manifold 100 is along the axis of tank 22. Slip joints 102, 104 are similar and only the bottom joint 104 is shown in detail in FIG. 3. Connector 92 has vertical portion 108 with upper end 110. Liner 114 has splash guard 116 peripherally secured thereto and the liner has portions extending above and below splash guard 116 at 118 and 120 respectively. Lower portion 118 closely fits within section 108 and liner 114 is held in position by guard 116 on the upper end 110 of conduit portion 108. The lower end 126 of central manifold 100 has bushing insert 128 secured thereto, bushing insert 128 being sized to rotate around extension portion 118 and supported at its lower end 129 by the splash plate 116 and capable of rotation about lower portion 118. The slip joint 102 at the top end is essentially the reverse of joint 104 with a slight gap or space, (e.g. from ¼ to ½"), between the top end of the bushing insert and splash plate. Cylindrical portion 130 of connector 86 and cylindrical section 132 of connector 92 are removably plugged to permit flushing or clean out of the manifold, as desired.

Figure 4:
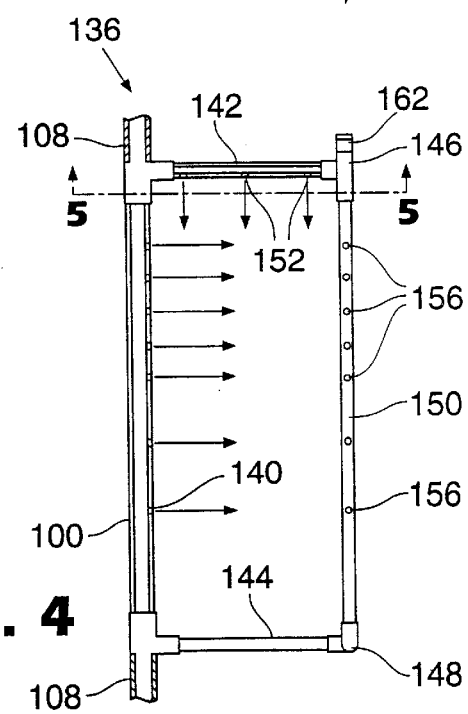
FIG. 4 is an elevational view, partly in section, of the central support and trust manifold of the embodiment of FIG. 1.

As seen in FIGS. 1 and 4, a manifold structure or system 136 is shown including central manifold 100 having a plurality of openings or nozzles 140 spaced along a substantial portion of its length, which openings or nozzles 140 are directed radially outwardly and aligned in a substantially vertical plane. Extending radially outwardly from manifold 100 are upper support manifold 142 and lower support manifold 144 which connect via connectors 146, 148 with a vertical thrust manifold 150 adjacent the inner periphery of tank 22. Manifold 150 is parallel with central manifold 100. Upper conduit 142 has downward openings or nozzles 152 and thrust manifold 150 has a plurality of horizontally directed openings or nozzles 156.

Figure 2:
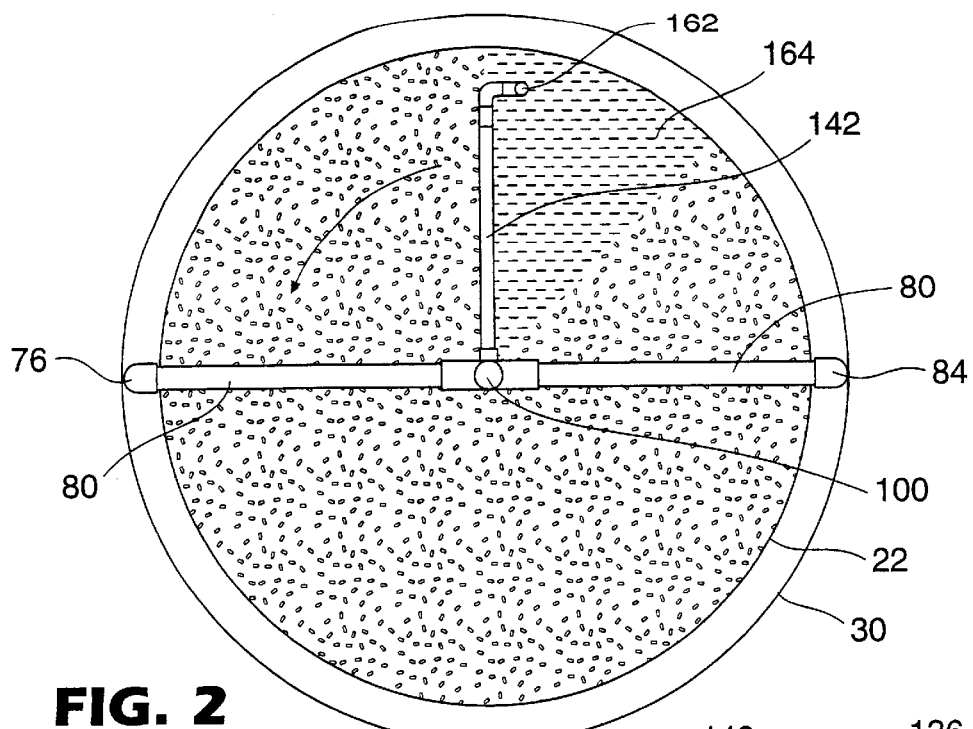
FIG. 2 is a top plan view thereof
Figure 5:
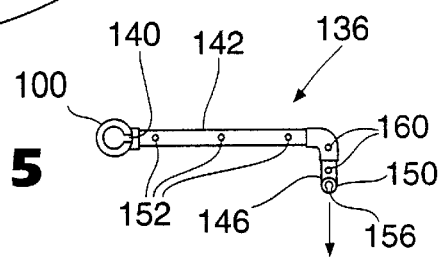
FIG. 5 is a partial sectional view of the manifold of FIG. 4, taken along line 5—5 of FIG. 4.

Turning to FIGS. 2 and 5, it will be apparent that thrust manifold 150 is offset from the plane defined by the central manifold 100 and upper and lower conduits 142, 144. It will also be noted from FIG. 5 that connector 146 also has downwardly directed openings or nozzles 160. Removable cap 162 of connector 146 provides for clean out of the thrust manifold 150. Liquid forced from horizontally directed openings 156 in thrust manifold 150 tends to rotate the filtrate manifold structure 136 comprising of the central manifold 100, thrust manifold 150 and upper and lower support manifolds 142, 144 in a counterclockwise direction as seen in FIG. 2. Downwardly directed nozzles 152 and 160 provide additional means for agitating and fluidizing the media bed to permit movement of pellets. Although not shown, upwardly directed nozzles or openings could be incorporated in lower support manifold 144.

Liquid to be processed, filtrate, is pumped by pump 70 into manifold structure 138 through conduits 72, 76, 78 and 80.

Filtrate pumped into central manifold 100 ejects radially outwardly from openings or nozzles 140. Filtrate is also forced via support manifolds 142, 144 to thrust manifold 150 and out openings or nozzles 156. Filtrate is also ejected from nozzles 152 and 160 of upper support manifold 142 and connector 146. As noted in the Summary of the Invention, filtrate ejected from nozzles 140 of central manifold 100 fluidizes pellet media over a zone or sector 164, (FIG. 2), commencing with a radial plane defined by the plane of nozzles 140 and resulting jets of filtrate 138 outwardly from the central manifold 100. Zone 164 rotates as the manifold structure 138 rotates.

The radially outwardly directed filtrate ejected from the central manifold nozzle 140 fluidizes the pellets in front of the thrust manifold thereby allowing it to move easily through the fluidized pellets 38 in front of it.

Figure 6:
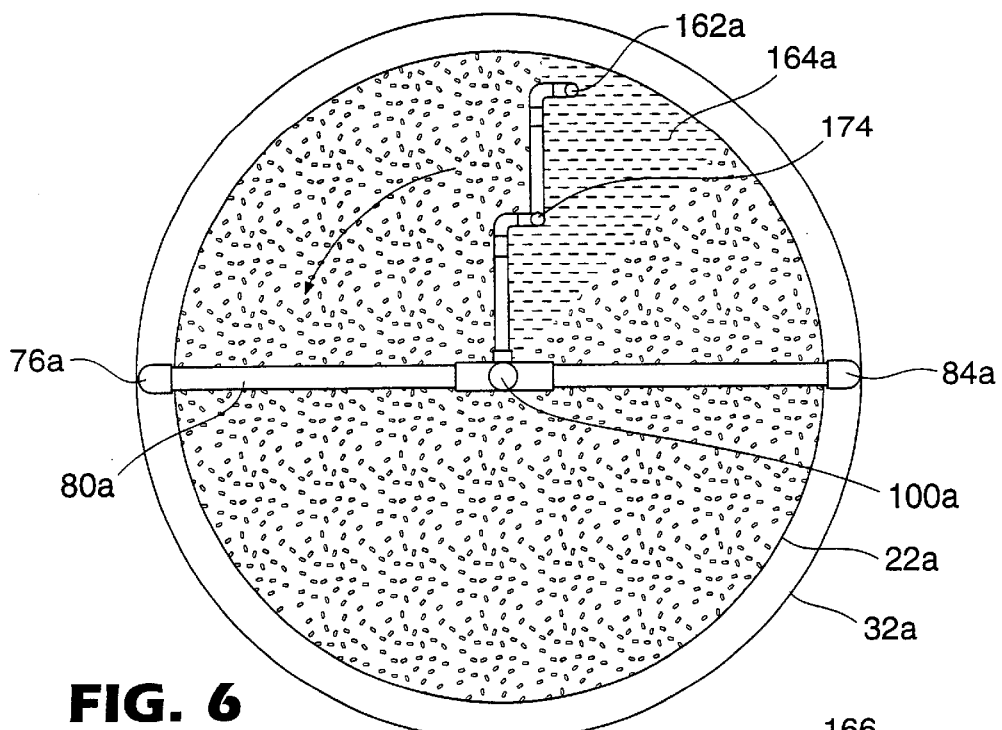
FIG. 6 is a top view of a second embodiment of the invention showing a manifold structure and ejector system with a secondary manifold.
Figure 8:
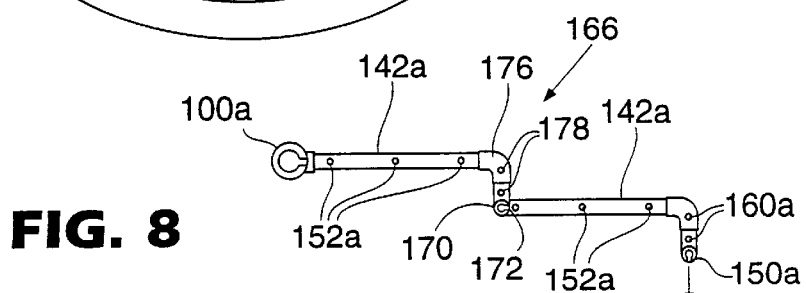
FIG. 8 is a partial sectional view of the manifold of FIG. 7 taken along line 8—8 of FIG. 7.
Figure 7:
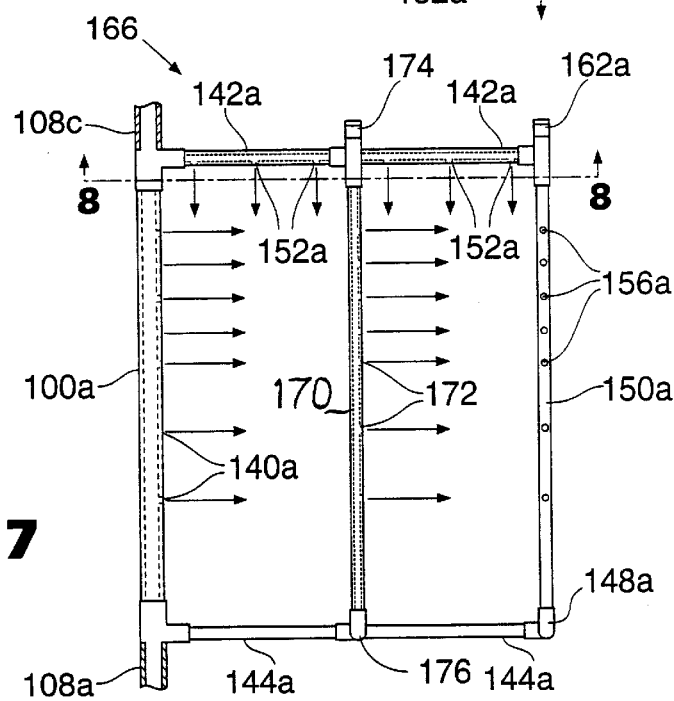
FIG. 7 is an elevational view, partly in section, of the central manifold support manifolds, secondary manifold and thrust manifold of the embodiment of FIG. 6.

FIGS. 6–8 illustrate a further embodiment wherein like features to those of FIGS. 1–5 are referred to with an "a" designation. Tank 22a is larger in diameter and there are two portions to the rotatable filtrate manifold structure 166. The manifold structure 166 has a secondary vertical manifold 170 with nozzles 172 projecting horizontally and radially outwardly. Secondary manifold 170 is supported by support manifolds 142a and 144a through upper and lower connectors 174, 176, upper connector 174 having nozzles 178 similar to nozzles 160a. As noted previously, as a tank increases in diameter, horizontal jets of fluid directed by nozzles 140a in the central manifold 100a are not effective in agitating and fluidizing pellets sufficiently in front of the thrust manifold 150a to allow it to move easily through the fluid, so a secondary vertical manifold, such as 170, with radially directed nozzles 172 is used. However, in order to provide suitable fluidization of media in front of secondary vertical manifold 170 to permit it to move through bed 36, the secondary manifold 170 is itself offset from central manifold 100a. As seen in FIGS. 6 and 8, jets from nozzles 172 of the secondary manifold 170 provide fluidization of media in front of thrust manifold 150a which is offset again from the secondary manifold 170. It will be apparent that additional "secondary" manifolds can be incorporated as may be appropriate for larger tanks. Further, if deeper beds are used, additional nozzles or openings in the central, thrust and any secondary manifolds can be provided.

Figure 9:
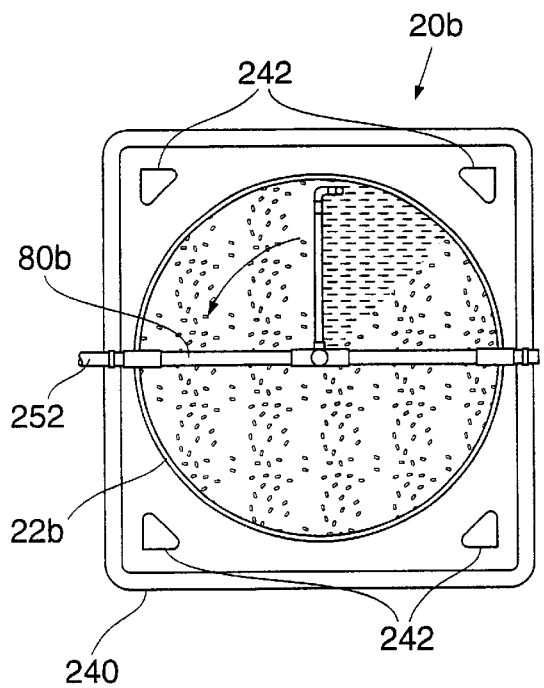
FIG. 9 is a top view of a further embodiment of the bioreactor system wherein the bioreactor is housed within a housing having a light system associated therewith.
Figure 10:
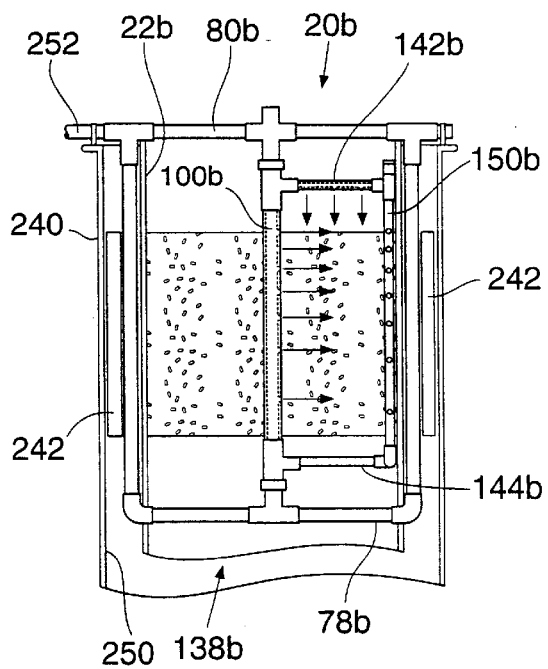
FIG. 10 is an elevational view of the embodiment of FIG. 9.

FIGS. 9 and 10 illustrate a modification of the bioreactor which may be particularly useful when the bioreactor is an algae or the like bioreactor. Similar features to those in FIGS. 1 and 2 have like references with a designation "b".

The main variation of the embodiment of FIGS. 9 and 10 is that the inner tank wall 22b is light, transparent or translucent and surrounded by a generally rectangular outer housing 240. Located within the space between tank 22b and housing 240 and adjacent the corners thereof are lights 242 which provide light to promote the growth of algae microorganisms in bioreactor 20b. Inside wall 250 of housing 240 is reflective to disperse light over the wall of tank 22b.

It will be noted from FIGS. 9 and 10 that the bioreactor 20b has filtrate inlet or conduit 252 supported from above by the walls of housing 240 and tank 22b. Manifold structure 138b is in effect hung from conduit 80b with added support from the walls of tank 22b where lower conduit 78b passes through the walls of tank 22b.

Figure 11:
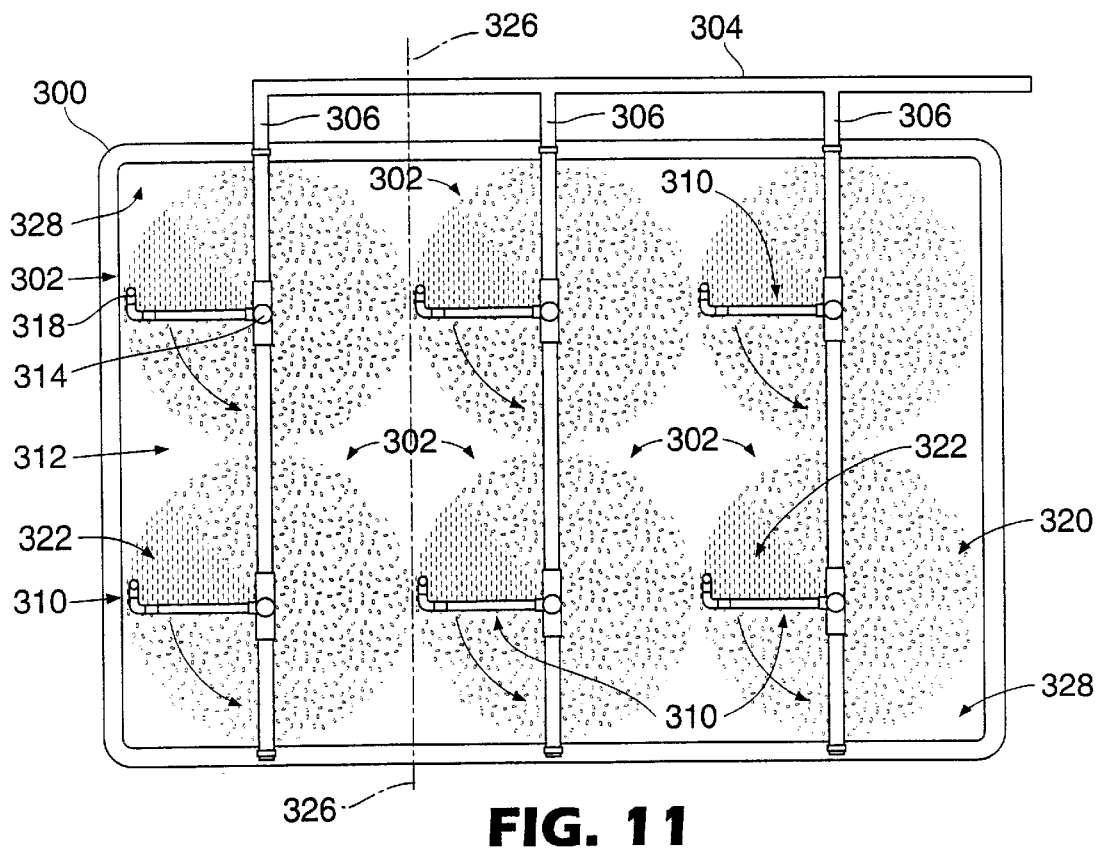
FIG. 11 is a top view of a larger tank of a bioreactor system with a plurality of manifold fluidizing ejector systems.

FIG. 11 illustrates in plan view a large tank or container 300 with a plurality of manifold systems 302 connected together. Inlet conduit 304 connects with three conduits 306 which cross the upper portion of tank 300, each conduit 306 being associated with two bioreactor manifold structures 310. Lower support conduits, (not shown), but similar to conduit 78b in FIG. 10 are below conduits 304.

Although conduits 306 are capable of supporting manifold structures 310, it will be apparent to those skilled in the art that separate support means within tank or container 300 can be used to support manifold structures 310. Each manifold structure 310 comprises a central main manifold 314 rotatably supported from conduit 306, a lower support conduit, (not shown) and thrust manifold 318, for rotation within the media bed 312.

The manifold system 302 are shown laterally separated or spaced for the purposes of clarity in illustration. Tank 300 contains a large bed of media pellets 312 but only the pellets within each sweep 320 of manifold 310 and within the fluidized sector 322 are shown.

In an actual embodiment of the system shown in FIG. 11, conduits 30b would be closer together to provide overlap of sweeps of manifold system 310. This will be apparent if the middle conduit 306 was moved leftward in FIG. 11 toward dotted line 326. Further, the force of the jets of filtrate from the manifolds have been found to actually extend further radially than schematically illustrated in FIG. 11 so that in practice, pellet media in corners 328 of tank 300 are effectively agitated.

Accordingly, conduit 30b need not be spaced together as close as dotted line 328 may suggest in order to agitate all the media pellets 312 in tank 300.

By way of illustration, in a 0.5 meter radius tank, applicant has found extremely effective, fluidization of pellets and bioreactor performance with a central manifold of about approximately 2 inches, (5 cm), diameter with frame and inlet conduits about approximately 1½ inches, (3.8 cm) and support and thrust manifolds of about 1 inch, (2.5 cm). The openings or nozzles are in the range of ⅜–½ inch range.

Turing now to the pellet media, the configuration of the filter media pellets having been refined and narrowly defined set of criteria for efficient operation of the bioreactor has been found.

Figure 12:
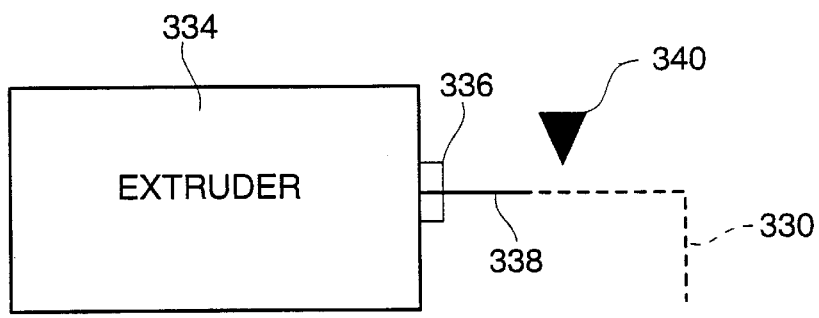
FIG. 12 is a schematic view of the manufacture of pellet media
Figure 13A:
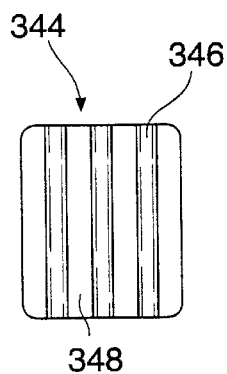
FIGS. 13 and 14 are plan elevational views of shapes of preferred pellet media manufactured to specified criteria.
Figure 14A:
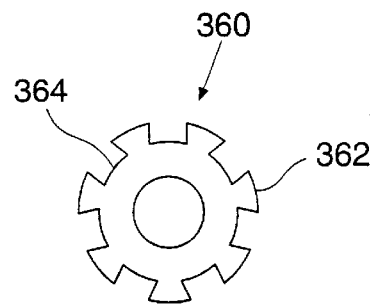
Figure 13B:
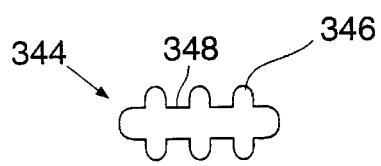
Figure 14B:
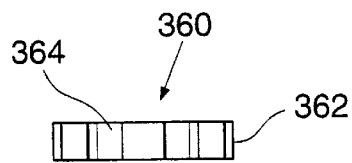

Turning to FIGS. 12–14, these FIGURES relate to pellet media 330 and its manufacture which applicant has particularly found effective in bioreactors of the present design.

FIG. 12 schematically illustrates an extruder 334 with die 336 for extruding plastic material 338 with slicer 340 positioned such that the elongated extruded material 338 may be sliced into pellets 330. Profiles of extruded material 338 and pellets 344, 350 are shown in FIGS. 13 and 14, each figure comprising a and b figures showing the pellets in plan view and elevational view respectively.

FIG. 13 shows a generally rectangular pellet 344 with ridges 346 and grooves 348 on both sides.

FIG. 14 shows generally circular hollow pellet 360, outer ridges 362 and grooves 364.

The physical parameters and optimal dimensional ranges for the pellets include:

Specific Gravity—0.91–0.95 relative to water

Size—(for disc shaped pellets) diameter 5–7 mm's—for rectangular pellets Width×Length, 5–7 mm's×5–7 mm's Thickness in both cases 3–4 mm's Grooves—Width 1 mm Depth 1 mm Ridge—Width>1.0 mm, preferably<than 1.25 mm's Unit Pellet Weight—minimum range 0.05–0.07 gm's Unit Pellet Volume—minimum range-0.055–0.077 ml's Surface area per unit volume of media—1750 $m^2/m^3$ Shape—A variety of shapes are possible which will maximize sheltered surface area per media pellet within the constraints of the above parameters. Simple configurations such as those shown in FIGS. 13 and 14 are preferable as they can be manufactured in a one step, low cost extrusion process.

It must also be recognized that a biofilm in a real world filter does not consist of a monoculture of one type of bacteria. It is instead an incredibly diverse eco-system including a wide range of microorganisms including bacterial, fungi, multicellular organisms and other algae, which all interact in metabolizing the waste stream and in consuming one another.

Applicant's bioreactor and the media developed are designed for culture of a wide range of microorganisms including algae which require a supporting surface and shelter.

The filter and media are not limited to bacterial cultures so that the size and configuration of the shelters, (media pellets), is critical to support these diverse microorganisms.

Figure 15:
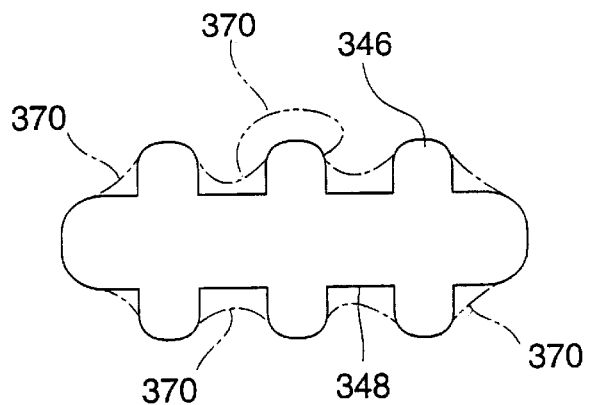
FIG. 15 is a partial sectional view of the pellet of FIG. 13 along lines 15—15 showing the formation of biofilm

Applicant has found that the relatively range grooves—approximately 1.0 mm×1.0 mm are optimal for sheltering a wide range of microorganisms. FIG. 15 illustrates pellets 344 with biofilm 370 with a groove.

Applicant has found that with grooves approximately 1.0 mm in width and approximately 1.0 mm wide, biofilm develops to about 300i (microns) or 0.3 mm in depth which has been found optimal to provide growth of the various and diverse microorganisms. The width of the ridges, as noted above in the specified criteria, are wider than 1 mm but preferably less than 1.25 mm to avoid interlocking of the pellets together which could defeat the effectiveness of the agitation of the pellets and scouring of excess biofilm It will be appreciated that the general rectangular configuration of the grooves provides for good adhesion and growth of biofilm. The configuration of the grooves in the embodiment of FIG. 14 illustrates that the ridges are slightly wider than the grooves by the nature of the grooves being generally rectangular in configuration.

The pellet design is not a random design as in other patents but is engineered to very specific criteria as described.

The original maximum depth for a biofilm to allow diffusion of nutrients and oxygen is about 300i (microns). The grooves of the pellets therefore are designed with a cross sectional area which allows development, shelter and maintenance of an optimal biofilm thickness.

With a groove of less than 1 mm×1 mm, the scouring action of the fluidization process will remove excessive amounts of biofilm This design provides an optimal habitat for growth of microorganisms in a fluidized bed environment and therefore provides the maximum amount of biological activity per unit volume of filter media.

A randomly manufactured media cannot support as much biofilm and most of the surface of a randomly structured media would not be able to provide shelter to the microorganisms.

In operation, which will have been clear from the above description, the manifold assembly or system provides for good, controlled fluidization of the pellet media, rather under effective feedback control by the nature of the pellets in front of the thrust manifold being fluidized by jets from the main or central manifold. It will be apparent that provided the thrust manifold is mounted for controlled rotation with the central manifold whereby the jets of filtrate from the central manifold and/or from any secondary manifolds fluidize pellets in front of the thrust manifold (and/or secondary manifolds), the manifold structure will be effective. Accordingly, it will be apparent any form of support for cooperative rotation of the central and thrust manifolds is an obvious modification of the invention provided filtrate fluid is fed to the thrust manifold to cause rotation of the manifold structure. Nevertheless, the preferred embodiment is with support means which also act as manifolds for delivering fluid filtrate to the thrust manifold, whether the support manifolds have nozzles or not.

Other modifications to the invention will be apparent to those skilled in the art which fall within the scope of the invention as defined in the appended claims.

What we claim is:

1. Apparatus for use in association with a bioreactor tank having a bed of media pellets to be fluidized and for treating filtrate in said tank through biofilm adhering to said pellets, comprising:

a vertical elongate first manifold having a plurality of openings spaced apart along its length, said openings in said first manifold being substantially disposed in a first plane extending lengthwise and directed radially outwardly of said first manifold;

an elongate thrust manifold having a plurality of openings spaced apart along its length, said openings in said thrust manifold being substantially disposed in a second plane extending lengthwise and directed radially outwardly of said thrust manifold;

mounting means for mounting said first manifold for rotation in said tank about a vertical axis extending lengthwise of said first manifold;

supporting means for supporting said thrust manifold in association with said first manifold such that said second plane is perpendicular to said first plane and said openings of said thrust manifold open in a direction extending away from said first plane, said supporting means also supporting said thrust manifold spaced from said first plane in said direction; and means for communicating filtrate to be treated under pressure to said first manifold and said thrust manifold, for fluidizing said pellets adjacent said thrust manifold by filtrate ejected from said openings of said first manifold and for rotating said first and thrust manifolds by filtrate ejected from said openings of said thrust manifold.

2. The apparatus of claim 1 wherein said supporting means comprises upper and lower support members, said support members extending between said first and thrust manifolds being substantially in said first plane defined by said first manifold opening.

3. The apparatus of claim 2 wherein at least the upper support member is a support manifold between and in fluid flow communication with said first manifold and said thrust manifold.

4. The bioreactor apparatus of claim 3 wherein said lower support member is also a support manifold between and in fluid flow communication with said first manifold and said thrust manifold.

5. The bioreactor apparatus of claim 4 wherein at least one of said upper and lower support members has openings intermediate its length, which openings are directed in the direction of the other of the support members.

6. Bioreactor apparatus having a media bed of buoyant pellets floating within a filtrate to be processed, comprising:
   a tank having a peripheral wall for containing the filtrate and a bed of media pellets;
   means for rotatably supporting a central manifold within said tank, said central manifold being mounted for rotation about a vertical axis and having a plurality of longitudinally spaced openings intermediate its ends, said openings being adapted to eject filtrate in a generally horizontal direction and along a substantially vertical plane toward said wall of said tank;
   a thrust manifold generally parallel to said vertical axis of said central manifold and having a plurality of longitudinally spaced openings intermediate its ends adapted to eject filtrate horizontally and generally perpendicular to said vertical plane;
   means for supporting said thrust manifold horizontally intermediate said central manifold and said wall of said tank and for rotation with said central manifold;
   means for feeding filtrate to said central manifold and said thrust manifold for fluidising said pellets disposed adjacent said thrust manifold on a side thereof facing in a given direction of rotation of said central manifold by filtrate ejected by said openings of said central manifold and for effecting rotation of said central manifold and said thrust manifold in said given direction by filtrate ejected from the openings in the thrust manifold.

7. The bioreactor apparatus of claim 6 wherein said supporting means comprise support means extending radially outwardly of said central manifold, external of said media bed.

8. The bioreactor apparatus of claim 7 wherein said support means comprises upper and lower support members, said support members both being substantially in the plane defined by filtrate ejected from said vertical openings in said central manifold.

9. The bioreactor apparatus of claim 8 wherein at least the upper support member is a support manifold between and in fluid flow communication with said central manifold and said thrust manifold.

10. The bioreactor apparatus of claim 9 wherein said lower support member is also a support manifold between and in fluid flow communication with said central manifold and thrust manifold and at least one of said support manifolds has openings for directing filtrate toward the media bed.

11. The bioreactor apparatus of claim 6 wherein said bioreactor tank is transparent or translucent and further comprises housing means surrounding said tank and light means being mounted between said tank and said housing.

12. The apparatus of claim 6 wherein the bed of media pellets comprise plastic pellets having a plurality of grooves and ridges wherein:
   each pellets have specific gravity of from 0.91 to 0.95 with at least one surface having ridges and grooves, the grooves being approximately 1 mm in width and 1 mm in depth, the ridges being greater than 1 mm to prevent interlocking with other like pellets and the pellets having unit weight of 0.05–0.07 gms.

13. The apparatus of claim 12 wherein said pellets are generally circular in shape and configuration with said ridges and grooves therein on the periphery thereof.

14. The apparatus of claim 12 wherein the plastic media pellets are generally rectangular in configuration with said ridges and grooves on at least one of said top and bottom surfaces and a ridge on at least one of said side edges.

15. Apparatus for use in association with a bioreactor tank having an inner peripheral surface surrounding a bed of media pellets to be fluidized and for treating filtrate in said tank through biofilm adhering to said pellet, said apparatus comprising:
   an elongated first manifold having a plurality of spaced nozzles along its length, said nozzles in said first manifold being substantially aligned lengthwise of and directed radially outwardly of the first manifold to define a first plane;
   a thrust manifold having a plurality of nozzles spaced along its length, said nozzles in said thrust manifold being substantially aligned lengthwise of and directed radially outwardly of said thrust manifold to define a second plane;
   means extending between said first and thrust manifolds for supporting said thrust manifold spaced from said first manifold and offset from said first plane such that the radially outward direction of the nozzles of said thrust manifold is substantially perpendicular to the radially outward direction of the nozzles of said first manifold;
   means for mounting said first and thrust manifolds for rotation relative to said tank in a given direction about an axis extending lengthwise of said first manifold with said first manifold being disposed centrally within said inner peripheral surface and said thrust manifold being disposed intermediate said first manifold and said peripheral surface, both said first manifold and said thrust manifold including means for communicating filtrate to be treated under pressure to said nozzles of said first manifold and said nozzles of said thrust manifold, when said apparatus is mounted in said tank, for fluidizing said pellets adjacent said thrust manifold on a side thereof facing in said given direction of rotation by filtrate ejected from said nozzles of said first manifold and for effecting rotation of said manifolds in said given direction by filtrate ejected from said nozzles of said thrust manifold.

* * * * *